June 6, 1950
C. C. SCHRIMPE
2,510,837
METHOD OF PREPARING RESINOUS REACTION PRODUCTS
FROM A PHENOL-FORMALDEHYDE CONDENSATE AND
A MONOHYDRIC ALCOHOL ESTER OF ROSIN
Filed July 24, 1948
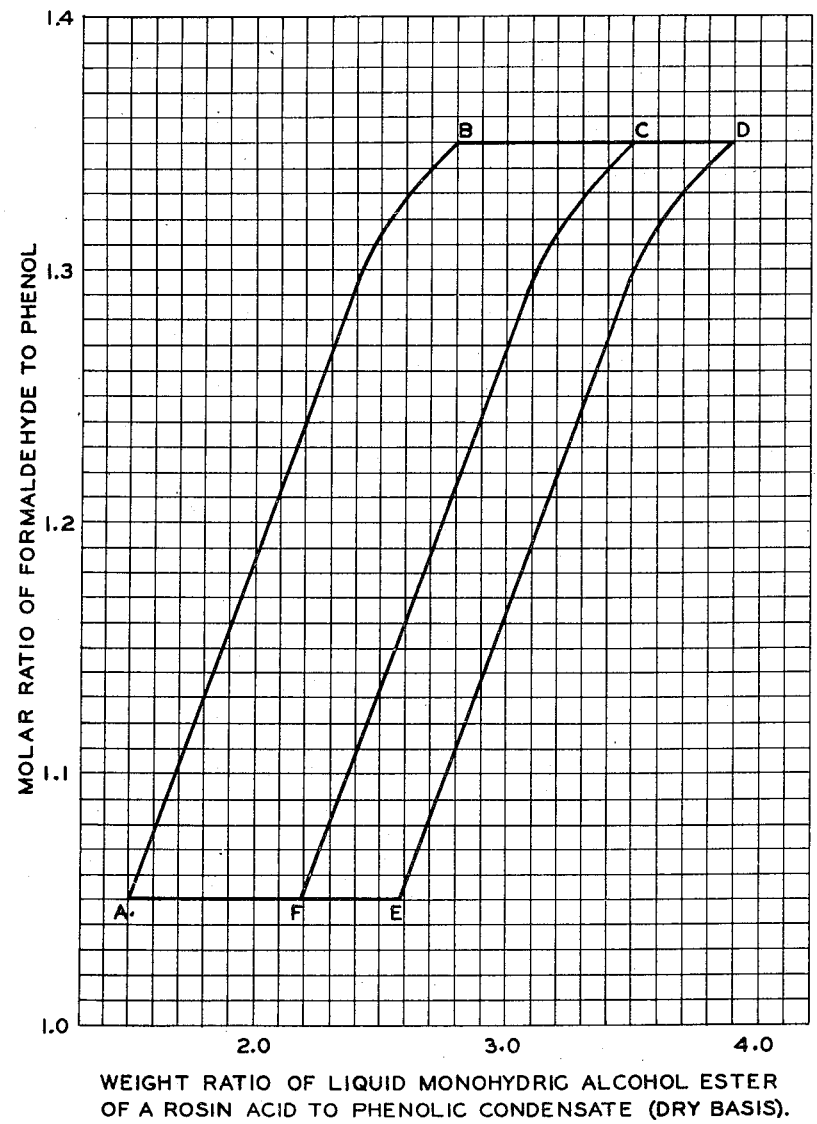
WEIGHT RATIO OF LIQUID MONOHYDRIC ALCOHOL ESTER
OF A ROSIN ACID TO PHENOLIC CONDENSATE (DRY BASIS).
CONRAD C. SCHRIMPE
*INVENTOR.*
BY Ernest G. Peterson
AGENT.

Patented June 6, 1950

2,510,837

UNITED STATES PATENT OFFICE 2,510,837

METHOD OF PREPARING RESINOUS REACTION PRODUCTS FROM A PHENOL-FORMALDEHYDE CONDENSATE AND A MONOHYDRIC ALCOHOL ESTER OF ROSIN

Conrad C. Schrimpe, Wilmington, Del., assignor to Hercules Powder Company, Wilmington, Del., a corporation of Delaware Application July 24, 1948, Serial No. 40,478

12 Claims. (Cl. 260—25)

This invention relates to improved synthetic resins and to methods for the production thereof. More particularly, this invention relates to improved synthetic resins of very desirable characteristics derived from a phenol-formaldehyde condensation product and a liquid monohydric alcohol ester of rosin and to methods for the production thereof.

It has been known to condense a phenol substituted in the para position with an alkyl radical such as the tertiary butyl radical with formaldehyde to prepare drying oil-soluble resins and to further react the resulting condensates with ester gum to prepare drying oil-soluble reaction products, see U. S. 1,800,295 to Honel. It is furthermore known to react drying oil-soluble phenol-aldehyde condensates with liquid esters of rosin to provide resinous products characterized by excellent solubility in drying oil and the usual varnish solvents, see U. S. 2,227,548 to Long. Liquid esters of rosin such as the methyl ester have also been employed in conjunction with phenol-aldehyde condensates where the rosin ester plays the role of a simple plasticizing ingredient unreacted with the phenolic condensate as described in U. S. 2,380,599 to Kline.

In accordance with the aforesaid U. S. 2,227,548, products characterized by drying oil-solubility and solubility in aliphatic hydrocarbons are produced by the reaction of alkaline-condensed phenol-aldehyde condensates with liquid esters of rosin. Furthermore, the alkaline-condensed phenol-aldehyde condensates utilized in the reaction are themselves soluble in drying oils. It has not heretofore been possible to successfully utilize phenol-aldehyde condensates characterized by drying oil-insolubility in this reaction for several reasons. In the first place, while it is possible to prepare a drying oil-insoluble, alkaline-condensed phenol-formaldehyde condensate, for example, using a molar ratio of formaldehyde to phenol of 1.0 or less and to react such condensate with a liquid ester of rosin, the resulting product is of little value in certain commercial arts due to its poor alkali-resistance. If a molar ratio of formaldehyde to phenol greater than 1.0 is employed, gellation of the phenolic condensate is encountered in attempting to react it with a desired liquid ester of rosin, the result being a heterogeneous product having no practical utility. Even when a 1.0 molar ratio is employed, the results are quite unpredictable and gellation of the phenolic condensate in the liquid ester of rosin is often encountered.

It has now been found that under certain conditions, reaction products having a unique combination of characteristics can be prepared from a drying oil-insoluble, alkaline-condensed phenol-formaldehyde condensate and a normally liquid monohydric alcohol ester of a rosin acid wherein the phenol-formaldehyde condensate is one derived by reacting more than 1.0 mol of formaldehyde per mol of phenol. Broadly, the process involves effecting reaction of the ingredients by dissolving the phenol-formaldehyde condensate and the ester of a rosin acid in a mutual solvent therefor which is sufficiently volatile to permit its separation from the resin ultimately formed by distillation, heating the solution thus formed at a temperature at least sufficiently high to cause exothermic reaction but not above 300° C. until the ester of a rosin acid has reacted substantially with the condensate and removing the solvent and any water present to form a hard clear resin. The mutual solvents which are particularly preferred are the aliphatic monohydric alcohols of from 4 to 6 carbon atoms such as 1-butanol, 1-pentanol, 3-methyl-1-butanol, 1-hexanol, etc.

More specifically, the process of the invention involves reacting phenol with from 1.05 to 1.35 mols of formaldehyde per mol of phenol in aqueous solution in the presence of an alkaline catalyst to produce a drying oil-insoluble condensate but which at the same time has not passed the B stage of polymerization. The reaction mixture is then acidified to cause formation of a condensate phase and an aqueous phase. The drying oil-insoluble condensate is separated from the aqueous phase with which it is in contact. The phenol-formaldehyde condensate and a desired normally liquid monohydric alcohol ester of a rosin acid are then dissolved in the mutual solvent. The resulting solution is heated to a temperature at least sufficiently high to cause exothermic reaction but not above 300° C., and heating is continued until the ester of a rosin acid has reacted substantially with the condensate to form a hard clear resin. The volatile solvent and any water present is removed by distillation during the heating step.

The proportions of the ester of a rosin acid and the phenol-formaldehyde condensate employed may be varied from 1.5:1 to 3.9:1 on a weight basis. The operable proportions of the ester of a rosin acid and the phenol-formaldehyde condensate vary depending upon the particular phenol-formaldehyde condensate employed, and the operable proportions are more particularly defined by the area ABDE of Figure 1.

The B stage of polymerization of the phenol-formaldehyde condensate, referred to in the previous paragraph, is well known terminology in the phenolic resin art, see "The Chemistry of Synthetic Resins," by Ellis, page 295. This is the stage in what may be termed the overall condensation reaction at which the condensate is insoluble in acetone, phenol or terpineol but which, if solid, swells upon contact with these reagents. Also the condensate at this B stage can be melted a limited number of times before passing into the infusible stage. The condensation of the phenol and formaldehyde in accordance with this invention is carried out to a point such that the condensate is drying oil-insoluble but at the same time has not passed the B stage of polymerization.

From a practical standpoint, a condensate having such characteristics can be obtained by measuring the free formaldehyde content of the reaction mixture at intervals during the condensation and stopping the condensation reaction at the point when the formaldehyde in the reaction mixture has been substantially completely consumed. When this method of control of the condensation reaction is employed, it is important that the reaction be stopped while the condensate is still in the B stage.

The hard resins of this invention possess a unique combination of characteristics which makes them particularly useful in the manufacture of mastic floor tiles and in other related manufactures. The resins are alkali-resistant. At the same time, they are substantially drying oil-insoluble, insoluble in aliphatic hydrocarbons such as gasoline and mineral spirits and are resistant to petroleum-base greases. The resins are thermoplastic in the sense that they can be melted several times without being converted to an insoluble, infusible product. The resins are also light in color, particularly if not subjected to unnecessarily high temperatures in their manufacture.

Referring to Figure 1, the vertical axis represents the various mol ratios of formaldehyde to phenol, whereas the horizontal axis represents various weight ratios of liquid monohydric alcohol ester of a rosin acid to phenol-formaldehyde condensate (dry basis). The area ABDE represents the area of operability in accordance with this invention. The area ABCF is representative of the preferred area of operability in which hard resins particularly resistant to aliphatic hydrocarbon solvents are produced. All resins represented by this area have a gasoline index of about 50 or higher. All the resins represented by the area ABDE, however, may be classed as substantially insoluble in aliphatic hydrocarbons. This property is quite a unique property when it is realized that the liquid monohydric alcohol esters of rosin from which they are derived are completely soluble in the aliphatic hydrocarbon solvents normally used in the paint and varnish industry such as mineral spirits, naphtha, etc.

Having thus indicated in a general way the nature and purpose of this invention, the following examples are offered to illustrate the practice thereof.

EXAMPLE 1

A resin was prepared from phenol, formaldehyde and the methyl ester of rosin in the following manner:

A. Preparation of phenol-formaldehyde condensate 1135 parts U. S. P. phenol (88% phenol)
1035 parts formalin (aqueous 37% HCHO)
60 parts aqueous 50% sodium hydroxide The phenol (previously melted on a steam bath), formaldehyde and sodium hydroxide solution were placed in a 3-liter, 3-neck flask equipped with a stirrer, a thermometer and a reflux condenser. The mixture was heated cautiously with agitation to 70° C. and held there for three hours. At this point, polarographic analysis showed that only 2% of the formaldehyde originally added remained unreacted. The mixture was then allowed to cool to 60° C. and 162 parts of aqueous 50% hydrogen chloride were added cautiously. At this point the pH of the reaction mixture had reached 1.15 and the reaction mixture had separated into 2 layers. The reaction mixture was then placed in an ice bath and allowed to cool to 30° C. The syrupy lower layer of phenol-formaldehyde condensate was then separated from the upper aqueous layer and washed with an equal volume of water. The phenol-formaldehyde syrup thus obtained amounted to 1524 parts and had a solids content of 71.0%. The solids content of the wet syrup was determined by dehydrating a 2 g. sample in a shallow disk in an oven at 150° C. for two hours. A sample of this phenol-formaldehyde condensate from which the water had been substantially entirely removed was found to be drying oil-insoluble, and to be in the B stage of polymerization.

B. Preparation of the resin 150 parts the above phenol-formaldehyde syrup (71% solids)
288 parts methyl ester of rosin
150 parts n-butyl alcohol The above ingredients were charged into a 1-liter, 3-neck flask equipped with a thermometer, a stirrer and a condenser, and the mixture was heated slowly with agitation to 200° C. over a period of about 1 hour. At about 160° C. an exothermic reaction was noted. The butanol and water were permitted to distill out of the flask. When the temperature had reached approximately 200° C., all of the butanol and water had been removed. The resin was held at 200° C. for one hour and was then poured. It was obtained in the amount of 365 parts and had the following physical characteristics:

Drop melting point (Hercules), 100° C.
Color, W. G. (U. S. rosin scale)
Gasoline index, 50

The product was a hard, clear, thermoplastic resin characterized by being resistant to 2% aqueous sodium hydroxide solution, insolubility in drying oils and aliphatic hydrocarbons and was resistant to petroleum base greases.

EXAMPLE 2

A. Preparation of the phenol-formaldehyde condensate

The same raw material formulation was employed as under part A of Example 1, and the same equipment was employed. The phenol, formaldehyde and sodium hydroxide were heated together cautiously with agitation to 70° C. and held there for 3 hours. The reaction mixture was then allowed to cool to 60° C. and 150 parts of aqueous 50% hydrogen chloride was added slowly. After the addition was complete, the resulting mixture separated into 2 layers at about 30° C. The water layer was discarded and the lower layer of phenol-formaldehyde condensate obtained was washed with an equal volume of water. 1531 parts of syrup remained, having a solids content of 70%. A sample of this phenol-formaldehyde condensate from which the water had been substantially entirely removed was found to be drying oil-insoluble, and to be in the B stage of polymerization.

B. *Preparation of the resin*

50 parts above phenol-formaldehyde syrup (70% solids)
94 parts methyl ester of rosin
37.5 parts isoamyl alcohol The above ingredients were charged into the equipment of Example 1B, and the mixture was heated slowly with agitation to 200° C. over a period of 1 hour. At about 160° C., an exothermic reaction was noted. The isoamyl alcohol and water were permitted to distill out of the flask. When the temperature had reached 200° C., substantially all of the alcohol and water had been removed. The resin was heated for one additional hour at 200° C. and then poured. 110 parts of resin were thus obtained having the following characteristics:

Drop melting point (Hercules), 108° C.
Color, N (U. S. rosin scale)

This resin was characterized by being substantially resistant to 2% aqueous sodium hydroxide, was drying oil-insoluble, insoluble in aliphatic hydrocarbons and unattacked by petroleum base greases.

While formalin has been employed in the examples, polymers of formaldehyde such as paraformaldehyde and other compounds, which under conditions of the reaction break down to yield free formaldehyde, may be employed equally well. It will be understood that the term "formaldehyde" as used herein and in the claims embraces such obvious equivalents of monomeric formaldehyde.

The condensation of phenol and formaldehyde is effected in the presence of an alkaline catalyst. As alkaline catalysts, alkali metal hydroxides such as sodium, potassium, lithium hydroxide; alkaline earth hydroxides such as calcium, barium, strontium hydroxides; hydroxides such as magnesium hydroxide, ammonium hydroxide, etc.; alkaline salts such as potassium carbonate, trisodium phosphate, etc.; aliphatic amines; quaternary ammonium hydroxides such as tetramethylammonium hydroxide, N-acetyl pyridinium hydroxide, benzyl trimethylammonium hydroxide, etc. may be employed. Regardless of which catalyst is used, the catalyst is neutralized by acidification to obtain the desired condensate. Desirably, the condensate is then washed with water in order to remove salts or any other water-soluble material before reacting with a liquid monohydric alcohol ester of a rosin acid. Water-insoluble salts, if present, can be removed by filtration, etc. The quantity of catalyst used is dependent on such factors as its own alkalinity, the temperature and time of reaction, etc. It will normally vary from about 0.5% to 25% of the phenol used. However, in the preparation of phenol-formaldehyde condensates using weak alkaline catalysts, it may be necessary to use a quantity of catalyst in excess of 25% by weight of the phenol.

The examples have illustrated the use of the preferred methyl ester of rosin in the formation of the desired resin. Broadly, however, any monohydric alcohol ester of a rosin acid may be employed provided the ester exists as a liquid at normal room temperature (21° C.). Thus, for example, the rosin acid esters of methyl, ethyl, propyl, isopropyl, butyl, etc. alcohols may be employed. As rosin acids in the formation of these esters there may be employed wood rosin, gum rosin, or any of the rosin acids obtainable from such rosins as for example abietic, l-pimaric, d-pimaric, sapinic, etc. acids. Furthermore, the rosin ingredient may be employed in the crude or refined form such as rosins refined by distillation, heat-treatment, extraction with selective solvents to remove color bodies, etc. It will be understood that the term "rosin acid" as used herein and in the claims embraces all such equivalents.

In preparing the phenol-formaldehyde condensate in accordance with this invention, the formaldehyde is employed in the amount of from about 1.05 to about 1.35 mols per mol of phenol to achieve the resins having the desired characteristics hereinbefore mentioned. The condensation is carried out in an aqueous medium at any operable temperature. For practical purposes, a reaction temperature of from about 10° C. to about 80° C. is generally employed with a temperature within the range of 60° C. to 70° C. being preferred. The time of reaction will vary depending upon the temperature, catalyst concentration, etc. As pointed out previously, it is important that the condensation be stopped at such point that the condensate obtained is drying oil-insoluble but at the same time has not passed the B stage of polymerization. If the condensation is carried further, the condensate will have little reactivity with the rosin esters.

When the condensation has proceeded to the point where a condensate having the required characteristics has been obtained, the reaction mixture is acidified to "kill" the catalyst. Various acid-reacting compounds may be used in the neutralization, thus, for example, inorganic acids such as hydrochloric, sulfuric, phosphoric, carbonic acid, etc. may be employed. Organic acids such as acetic, lactic, formic, citric, oxalic, malic acid, etc. may be employed. Acid salts such as $NaHSO_4$, $NaH_2PO_4$ etc. may be employed. Sufficient of the acid-reacting compound must be added to the reaction mixture not only to neutralize the alkaline catalyst but to effect a separation of the reaction mixture into two phases, one being an aqueous phase and the other the desired condensate. The exact pH at which a separation occurs varies somewhat with the acid-reacting compound employed. The condensate is then separated from the aqueous phase and preferably washed with water to remove residual acid or salts. Water-insoluble salts, if present, can be removed by filtration, etc. The condensate so obtained contains some water which can be removed if desired prior to reaction with the monohydric alcohol esters of a rosin acid. It is convenient to allow the water to remain in the condensate at this stage and remove it along with the volatile solvent at a later stage.

The condensate is then reacted with a desired liquid monohydric alcohol ester of a rosin acid, the operable proportions being defined by the area ABDE of Figure 1. These proportions apply to the dry or dehydrated form of phenolic condensate. The amount of dry phenolic condensate obtainable from a wet phenolic condensate can be ascertained by determining the solids content of the wet condensate by the procedure of Example 1. It will be noted that as the molar ratio of formaldehyde to phenol is increased, the minimum ratio of ester to condensate which is operable increases as does the maximum ratio. Compositions represented by the area to the left of the line AB are inoperable due to the fact that gellation is encountered leading the heterogeneous products of little practical utility. Similarly, compositions represented by the area above line BCD are inoperable. Compositions represented by the area to the right of line DE do not possess the characteristics of substantial insolubility in aliphatic hydrocarbons and resistance to petroleum base greases which characterize the compositions defined by the area ABDE.

To effect reaction between the phenol-formaldehyde condensate and the desired monohydric alcohol ester of a rosin acid, the reactants are dissolved in a mutual solvent therefor which is sufficiently volatile to permit its separation from the resin ultimately formed by distillation. The solvents preferred in this connection are the aliphatic monohydric alcohols of from 4 to 6 carbon atoms such as 1-butanol, 2-butanol, 2-methyl-2-propanol, 1-pentanol, 2-pentanol, 3-pentanol, 3-methyl-1-butanol, 2-methyl-1-butanol, 2-methyl-2-butanol, 1-hexonal, etc. Particularly preferred is the solvent 1-butanol. When this class of solvents is employed, the solvent and any water present can be distilled azeotropically from the solution upon heating.

The mutual solvent is employed in at least such an amount as to provide a homogeneous, i. e., clear, solution comprising the phenol-formaldehyde condensate and the rosin ester at the temperature at which the solvent starts distilling from the solution. In practice, the solvent is usually employed in the amount of at least 100% by weight of the phenol-formaldehyde condensate (dry basis), and preferably in the amount of from 130% to 150% by weight of the phenol-formaldehyde condensate (dry basis).

The solution thus formed is heated to a temperature at least sufficiently high to cause an exothermic reaction to take place. The temperature at which exothermic reaction takes place will vary somewhat depending upon the particular phenol-formaldehyde condensate employed, the proportions of the ester of a rosin acid to phenol-formaldehyde condensate, etc. This temperature will be, however, in most cases above 150° C. Temperatures above 300° C. cause decomposition of the resin formed and are hence unsatisfactory. Although the reaction of the phenol-formaldehyde condensate and the ester of a rosin acid can be effected over the broad range of temperatures above-indicated, it is preferred to employ a temperature of from 180° C. to 230° C. and to continue the reaction until the ester of a rosin acid has reacted substantially with the phenol-formaldehyde condensate. The mutual solvent and any water present are removed from the resin formed by distillation during this heating step. As indicated by the examples, if moderate reaction temperatures are employed, the mutual solvent and water may be permitted to distill off from the reaction mixture slowly while the reaction is progressing. After the mutual solvent and water have been substantially entirely removed, the resin can be subjected to a further period of heat-treatment to remove other volatile constituents and to raise the melting point of the resin. Temperatures above 300° C. should not be used and temperatures from 180 to 230° C. are satisfactory for this purpose.

The hard resins prepared in accordance with this invention are unique in that they have as one of their ingredients a large percentage of a liquid monohydric alcohol ester of a rosin acid such as the methyl ester which is infinitely soluble in or miscible with aliphatic hydrocarbon solvents, such as gasoline. However, when these rosin esters are reacted with phenol-formaldehyde condensates in accordance with this invention, the resultant hard resins are essentially insoluble in aliphatic hydrocarbon solvents such as gasoline. The insolubility in aliphatic hydrocarbons when combined with drying oil-insolubility, alkali resistance and resistance to petroleum base greases provides a unique combination of properties for the subject resins.

When compounded with fillers and compatible plasticizers, these resins provide compositions characterized by unusual toughness. Their light color is an added advantage in that compositions containing the same can be tinted to light pastel shades. The resins per se are relatively free of objectionable odors.

The resins of this invention are very useful as a component of the mastic floor tile manufacture due to the fact that the use of such resins enable the production of tiles characterized by pale color, excellent resistance to alkalies, excellent resistance to petroleum base greases and aliphatic hydrocarbon solvents and superior wearing properties. A typical formation using such a resin, for example, the resin of Example 1, is the following:

| | Parts |
|---|---|
| Asbestos fiber | 435 |
| Limestone dust | 220 |
| Example 1 resin | 250 |
| Hydrogenated methyl ester of rosin | 20 |

The above ingredients are compounded on a two-roll mill into a tile which is characterized by excellent resistance to alkalies, pale color, resistance to petroleum hydrocarbons and good impact resistance. Other plasticizers may be substituted in the above formulation for the hydrogenated methyl ester of rosin, such as dibutyl phthalate, ethyl phthalyl, ethyl glycolate, etc., and the proportions of the ingredients may be varied widely. It is possible to further vary the tile properties, with particular reference to increasing its flexural and impact strength, by the incorporation of compatible polymers such as natural rubber, various synthetic rubbers, vinyl copolymers such as the copolymer of vinyl acetate and vinyl chloride, etc., vinyl polymers such as polyvinyl butyral, etc., ethyl cellulose, etc.

The Example 1 resin also finds utility in the manufacture of phonograph discs. Thus, the resin of Example 1 may be used in the following formulation:

| | Parts |
|---|---|
| Shellac | 300 |
| Example 1 resin | 100 |
| Copal gum | 40 |
| Vinsol resin | 40 |
| Zinc stearate | 6 |
| Carbon black | 20 |
| Ground whiting | 1,125 |
| Slate flour | 375 |

(Vinsol resin is extracted pinewood pitch characterized by substantial insolubility in petroleum hydrocarbons and comprising a residue low in abietic acid remaining after separation of refined rosin high in abietic acid from the resinous material obtained by extraction of pine wood with a solvent.)

The above ingredients are reduced to a powder and thoroughly mixed before being processed on a two-roll mill to produce a uniformly blended composition. The composition is sheeted from the two-roll mill, allowed to cool and broken up. Records are prepared from the composition in the usual manner.

The resins of the invention are compatible with synthetic rubbers such as Buna N (copolymer of butadiene and acrylonitrile), neoprene latex, etc., cellulose derivatives such as ethyl cellulose, etc., vinyl polymers such as polyvinyl butyral, etc., vinyl copolymers, etc., and with various resins such as the cumars, rosin esters, etc. In view of these compatibility characteristics, the resins may be used in thermoplastic protective coatings, adhesive compositions, etc., in conjunction with the above-mentioned film-formers. The resins may also be used with synthetic rubbers in various rubber compounding operations.

Emulsions of the resins may be compounded with synthetic rubbers such as neoprene latex, etc., and the resulting compositions used in adhesive applications and in the back-sizing of rugs. The thermoplastic resins may also be used without any additional film-forming materials for back-sizing rugs to provide stiffness and shampoo resistance.

All parts and proportions in this specification and claims are by weight unless otherwise indicated.

What I claim and desire to protect by Letters Patent is:

1. The method of producing a hard resin which is substantially alkali-resistant, insoluble in drying oils and aliphatic hydrocarbons and resistant to petroleum base greasees which comprises reacting phenol with from 1.05 to 1.35 mols of formaldehyde per mol of phenol in aqueous solution in the presence of an alkaline catalyst to produce a drying oil-insoluble condensate which has not passed the B stage of polymerization, acidifying the reaction mixture, separating the condensate from the aqueous solution, dissolving the condensate and a normally liquid monohydric alcohol ester of a rosin acid in a mutual solvent therefor which solvent is sufficiently volatile to permit its separation from the resin ultimately formed by distillation, heating the solution thus formed to a temperature at least sufficiently high to cause exothermic reaction and to cause the solvent and any water present to distill off but not above 300° C., continuing said heating until the solvent and any water present has been removed and until the ester has reacted substantially with the condensate to provide a hard clear resin, the proportions of condensate and ester of a rosin acid employed being defined by the area ABDE of Figure 1, the monohydric alcohol radical of said monohydric alcohol ester of a rosin acid being free of substituents which are reactive with the condensate.

2. The method of claim 1 wherein the mutual solvent is an aliphatic monohydric alcohol of from 4 to 6 carbon atoms.

3. The method of claim 2 wherein the normally liquid monohydric alcohol ester of a rosin acid is the methyl ester.

4. The method of claim 3 wherein the solution of the condensate and the methyl ester of a rosin acid in an aliphatic monohydric alcohol of from 4 to 6 carbon atoms is heated to a temperature of from 150° C. to 300° to cause an exothermic reaction and to cause the solvent and any water present to distill off, said heating being continued until the solvent and any water present has been removed and until the ester has reacted substantially with the condensate to provide a hard clear resin.

5. The method of claim 4 wherein the solution of the condensate and the methyl ester of a rosin acid in an aliphatic monohydric alcohol of from 4 to 6 carbon atoms is heated to a temperature of from 180° C. to 230° C. to cause an exothermic reaction and to cause the solvent and any water present to distill off, said heating being continued until the solvent and any water present has been removed and until the ester has reacted substantially with the condensate to provide a hard clear resin.

6. The method of claim 5 wherein the mutual solvent is employed in at least such an amount as to provide a homogeneous solution comprising the phenol-formaldehyde condensate and the rosin ester at the temperature at which the solvent starts distilling from the solution.

7. The method of claim 1 wherein the mutual solvent is employed in at least such an amount as to provide a homogeneous solution comprising the phenol-formaldehyde condensate and the rosin ester at the temperature at which the solvent starts distilling from the solution.

8. The method of claim 1 wherein the proportions of phenolic condensate and the normally liquid monohydric alcohol ester of a rosin acid are employed in the proportions defined by the area ABCF of Figure 1.

9. The method of claim 3 wherein 1-butanol is employed as the mutual solvent.

10. The method of claim 3 wherein isoamyl alcohol is employed as the mutual solvent.

11. The method of claim 3 wherein sodium hydroxide is employed as catalyst for the phenol-formaldehyde condensation and wherein hydrochloric acid is employed to acidify the phenol-formaldehyde reaction mixture.

12. The method of producing a hard resin which is substantially alkali-resistant, insoluble in drying oils and aliphatic hydrocarbons and resistant to petroleum base greases which comprises reacting phenol with from 1.05 to 1.35 mols of formaldehyde per mol of phenol in aqueous solution in the presence of an alkaline catalyst until the formaldehyde has been substantially entirely consumed to provide a condensate which has not passed the B stage of polymerization, acidifying the reaction mixture, separating the condensate from the aqueous solution, dissolving the condensate and a normally liquid monohydric alcohol ester of a rosin acid in a mutual solvent therefor which solvent is sufficiently volatile to permit its separation from the resin ultimately formed by distillation, heating the solution thus formed to a temperature at least sufficiently high to cause exothermic reaction and to cause the solvent and any water present to distill off but not above 300° C., continuing said heating until the solvent and any water present have been removed and until the ester has reacted substantially with the condensate to provide a hard clear resin, the proportions of condensate and ester of a rosin acid employed being defined by the area ABDE of Figure 1, the monohydric alcohol radical of said monohydric alcohol ester of a rosin acid being free of substituents which are reactive with the condensate.

CONRAD C. SCHRIMPE.

REFERENCES CITED

The following references are of record in the file of this patent:

UNITED STATES PATENTS

| Number | Name | Date |
| --- | --- | --- |
| 1,922,272 | Bender | Aug. 15, 1933 |
| 2,380,599 | Kline | July 31, 1945 |
| 2,459,651 | Jones | Jan. 18, 1949 |

Certificate of Correction

Patent No. 2,510,837 — June 6, 1950

CONRAD C. SCHRIMPE

It is hereby certified that errors appear in the printed specification of the above numbered patent requiring correction as follows:

Column 4, line 3, for "70% C." read *70° C.*; column 7, line 19, for "1-hexonal" read *1-hexanol*; column 9, line 30, for "greasees" read *greases*; line 66, for "300°" read *300° C.*;

and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*